United States Patent [19]

Fick

[11] Patent Number: 5,296,984
[45] Date of Patent: Mar. 22, 1994

[54] ADAPTER PLATE FOR COUPLING A HEAD TO AN ACTUATOR ARM IN A DISK DRIVE ASSEMBLY

[76] Inventor: Adolf L. Fick, 10130 N. Blaney Ave., Cupertino, Calif. 95014

[21] Appl. No.: 35,742

[22] Filed: Mar. 23, 1993

[51] Int. Cl.[5] .............................................. G11B 5/48
[52] U.S. Cl. .................................................. 360/104
[58] Field of Search ............................... 360/104–106, 360/109

[56] References Cited

U.S. PATENT DOCUMENTS 4,943,875 7/1990 Reidenbach ..................... 360/104
4,947,275 8/1990 Hinlein ............................ 360/104

OTHER PUBLICATIONS

IBM TDB, vol. 30, No. 11, Apr. 1988; Head Bar Attachment.

Primary Examiner—A. J. Heinz
Attorney, Agent, or Firm—Blakely, Sokoloff, Taylor & Zafman

[57] ABSTRACT

An adapter plate for removably coupling an actuator arm end with a load beam and a transducer head. The adapter plate can be installed with a reliable, verifiable pressure, and removed easily without damage for rework or repair of the transducer head. The adapter plate includes a plate surface for coupling with a load beam, a latch hook formed on a first edge, and a coupling hook formed on a second, opposite edge. The coupling hook includes a notch formed centrally therein and extending inward toward the plate surface. The actuator arm end includes a grooved edge with a V-shaped groove formed therein and a latching edge opposite the grooved edge. A tapered pin is inserted between the notch in the coupling hook and the V-shaped groove so that the plate surface is pressured against the portion of the actuator arm end proximate thereto. For a multidisk system in which an actuator arm assembly includes multiple actuator arms, two adapter plates can be installed on one actuator arm, one on each side, and either of the adapter plates can be removed and re-installed without affecting the other adapter plate.

14 Claims, 4 Drawing Sheets

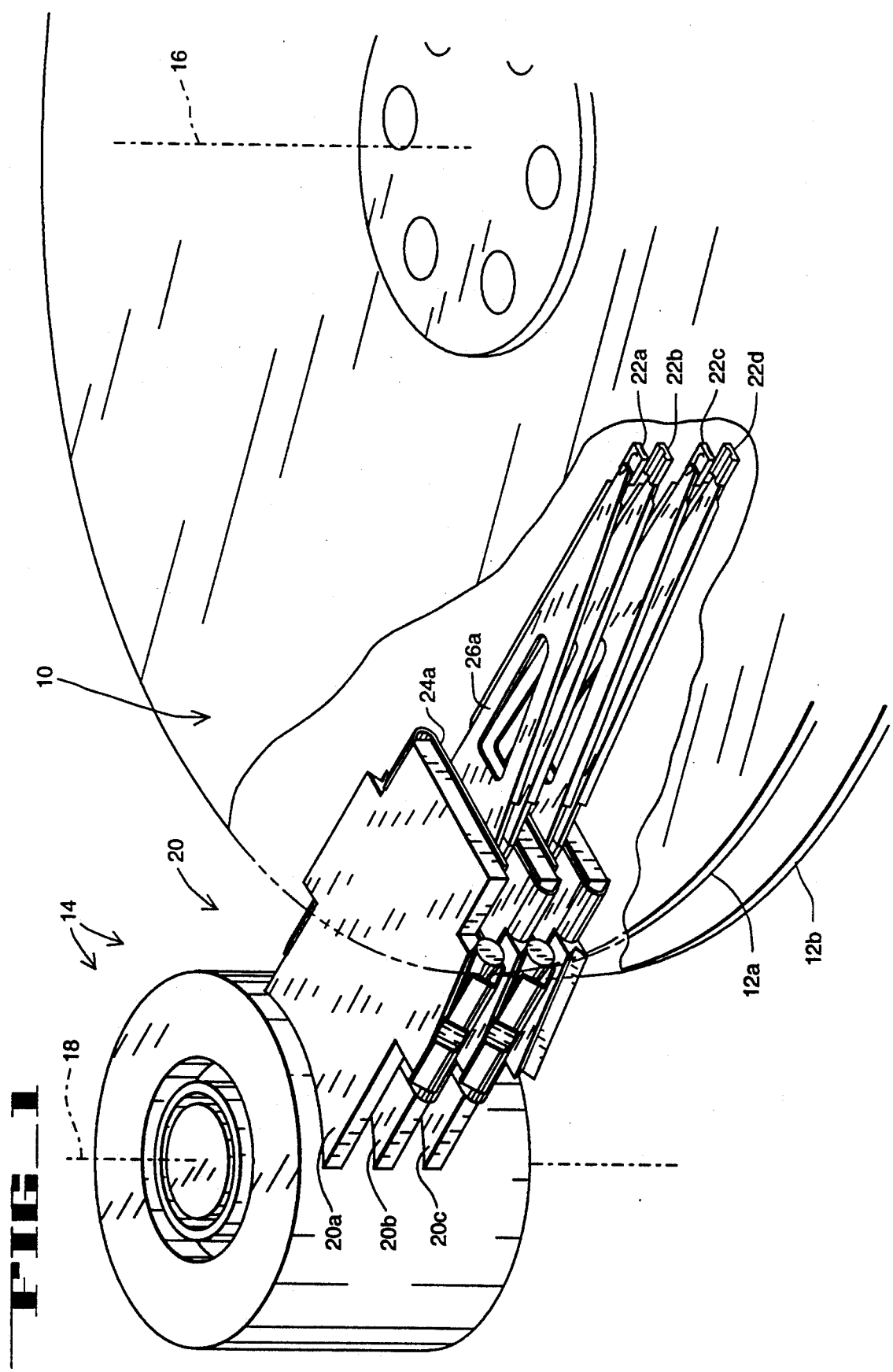
FIG_1

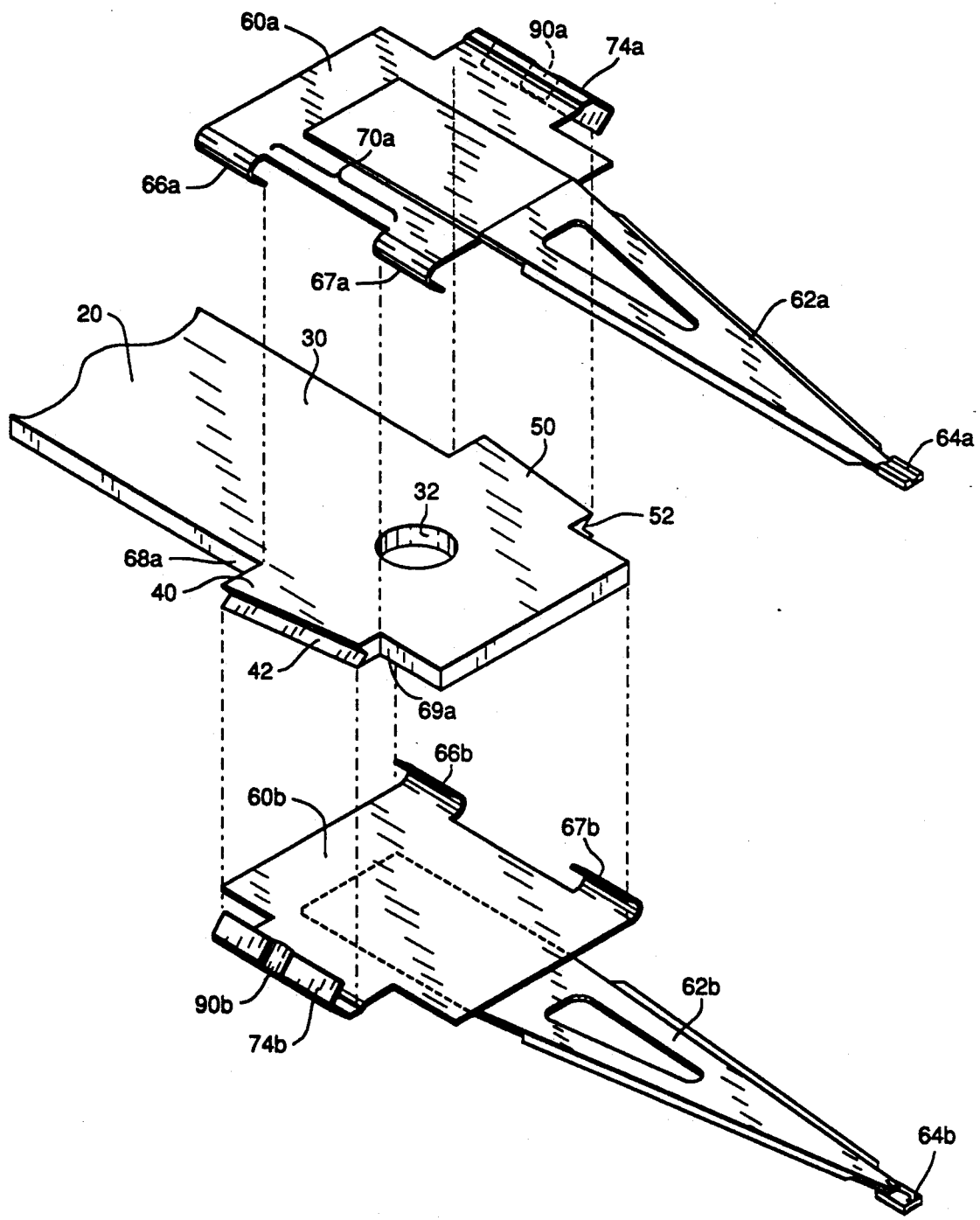
FIG_2

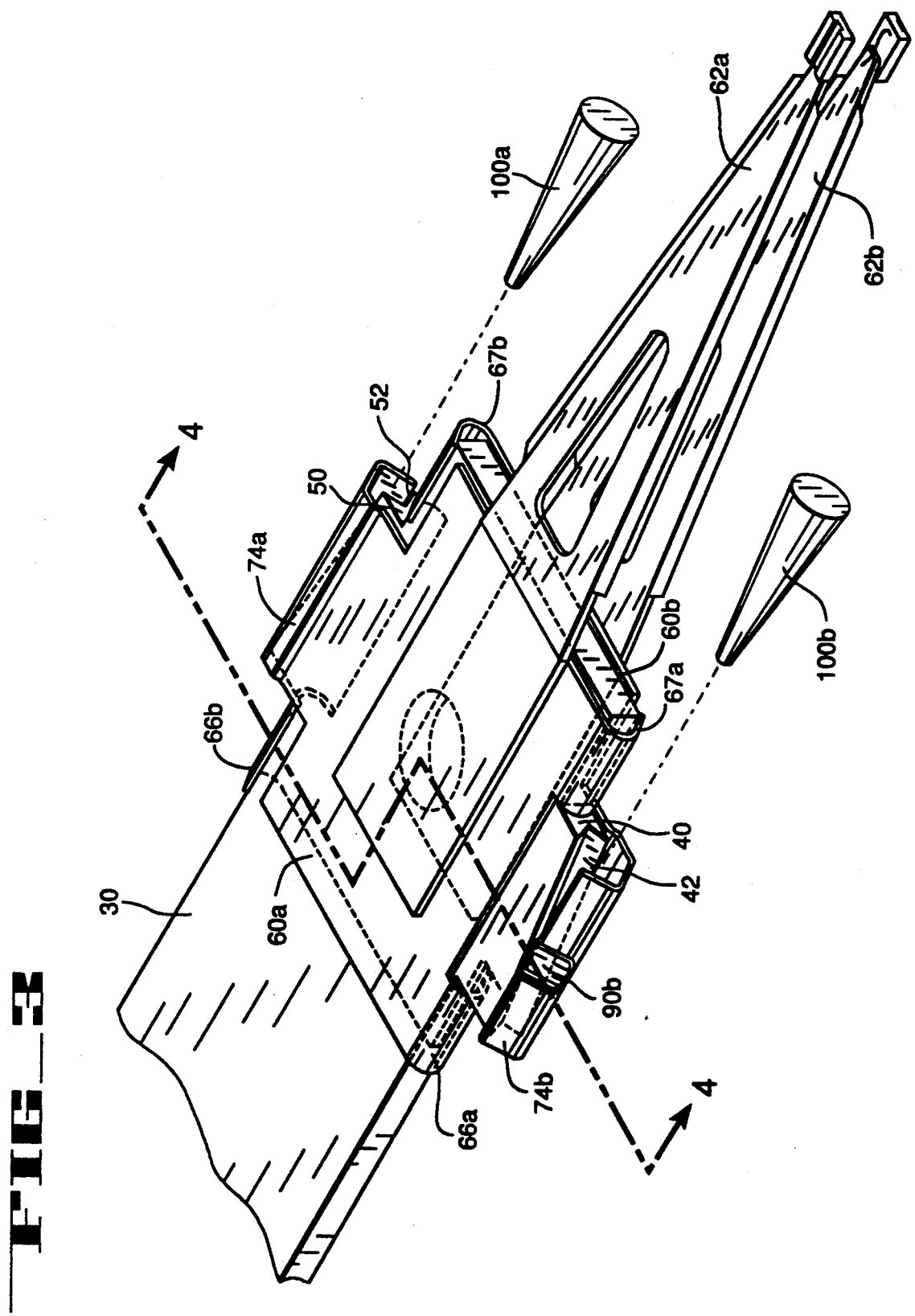

FIG_4
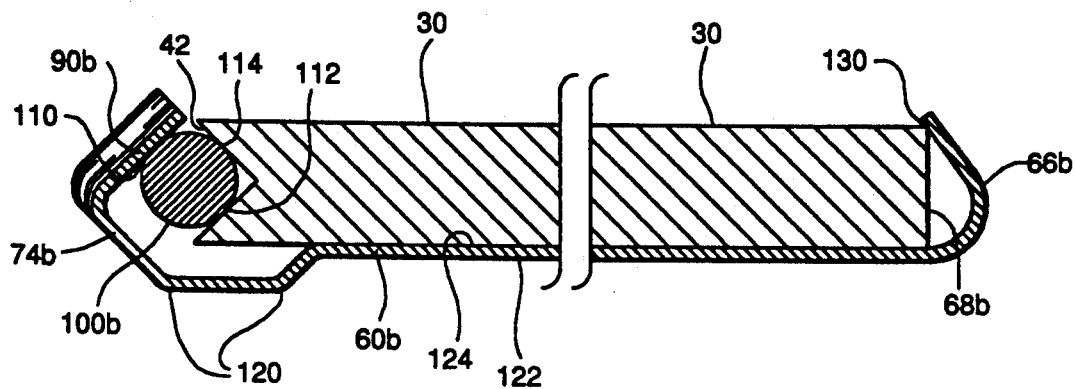
FIG_5
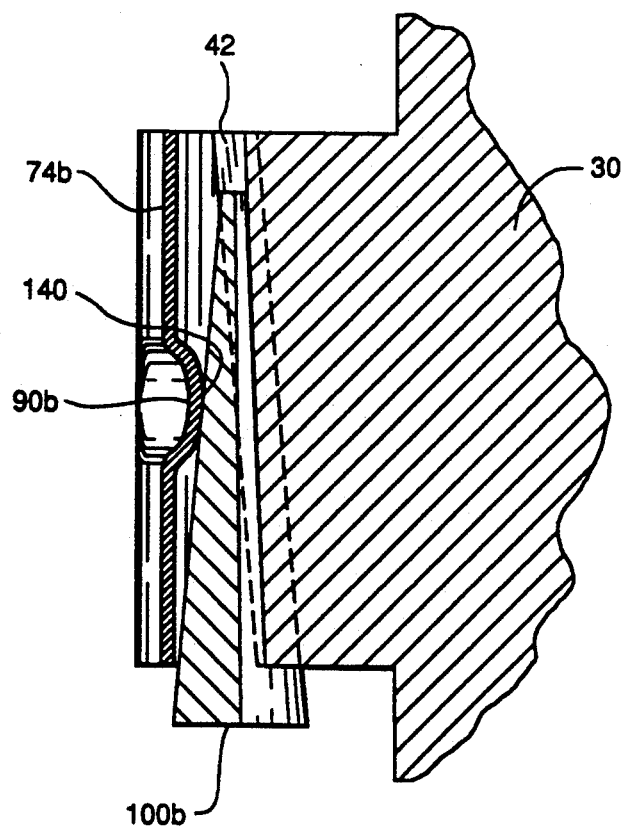

ADAPTER PLATE FOR COUPLING A HEAD TO AN ACTUATOR ARM IN A DISK DRIVE ASSEMBLY

BACKGROUND OF THE INVENTION

1. Field of the Invention

The present invention relates to arm assemblies for disk drives. More specifically, the present invention relates to an adapter for coupling an actuator arm with a transducer head.

2. Description of Related Art

Actuator arm assemblies are utilized within disk drive units for positioning a transducer head to read and write data in selected sections of a magnetic storage disk. One or more actuator arms form a part of the actuator arm assembly. Each actuator arm is coupled to a transducer head. The entire arm assembly is pivotable so that each head moves over the surface of its respective disk.

Some disk drive units have multiple magnetic disks in a standard configuration. In these disk drive units, the arm assembly includes a plurality of actuator arms positioned proximate to the stacked disks. Each of the actuator arms is coupled with a transducer head for reading and writing data. Each head contacts its disk with a load pressure provided by a load beam that connects the head with one of the actuator arms. To connect a load beam with an actuator arm, an adapter plate is often used. The load beam is spot welded to the adapter plate, which is fastened to the actuator arm end. A conventional method of fastening the adapter plate to the actuator arm is termed a "ball staking" method.

The ball staking method requires that the adapter plate have a hole formed therein with a sleeve extending therefrom. First, the extended sleeve is inserted in the actuator arm, specifically into a hole formed near the end of the actuator arm. Then, a ball is pressed through the hole in the adapter plate sleeve to deform the sleeve and generate an interference fit between the sleeve and the actuator arm end, thereby affixing the adapter plate to the actuator arm. To generate the required tightness of the interference fit, additional balls having progressively larger diameters may be pushed through. This process can be difficult and time consuming, which can increase manufacturing costs.

The ball staking process is particularly difficult in multiple disk systems, in which at least one actuator arm is positioned between two disks. Each of the two sides of an "in-between" arm has an adapter plate attached to a transducer head, and both of these adapter plates have sleeves that are affixed in the same hole in the actuator arm. If the actuator arm is thick, a reasonably good fit could be provided even if both sleeves have the same diameter. In that instance, both sleeves can be deformed against the hole without overlapping. However, fast, high performance actuator arms are thin to reduce weight, and the two sleeves necessarily overlap. This requires that the inner diameter of a first sleeve fits closely within the outer diameter of a second sleeve. This requires that the inner diameter of a first sleeve fits closely within the outer diameter of a second sleeve. Production of the overlapping configuration is difficult and time consuming, and requires very tight tolerances, particularly between inner and outer diameters of both sleeves and the hole.

In addition to manufacturing difficulties, the ball staking method has other drawbacks. If the adapter plate must be removed from the arm after the ball has been inserted and pressed into place, the only way is by forcible removal which could damage the adapter plate or the actuator arm. This problem is particularly acute when two adapter plates are affixed by overlapping sleeves into the same hole: damage to one or both adapter plates is likely. As a result of this problem, a certain percentage of magnetic head assemblies (defined as the adapter plate, load beam, and head) will be scrapped.

Another problem with the ball staking process is difficulty verifying proper assembly during manufacture. The adapter plate must have a sufficiently tight interference fit. However, it is very difficult to determine if the sides of the extended sleeve are tightly pressed against the hole within the actuator arm and that the plate itself is tightly pressed against the actuator arm end. If adapter plate is not affixed tightly, then undesirable mechanical resonances could be produced, which would result in a substantial reduction in performance.

It would be an advantage to provide an adapter plate coupling for an actuator arm that could easily be coupled to the actuator arm and easily removed therefrom. It would be a further advantage if the adapter plate could be installed on an actuator arm with a predictable pressure during the manufacturing process.

SUMMARY OF THE INVENTION

The present invention provides an adapter plate for coupling an actuator arm end with a load beam and a transducer head. The adapter plate can be installed with a reliable, verifiable pressure. Furthermore, the adapter plate can be removed easily without damage for rework or repair of the transducer head.

These and other advantages are provided by an adapter plate that includes a plate surface for coupling with a load beam. The plate surface includes a first edge and a second edge opposite the first edge. A latch hook is formed on the first edge with a shape for hooking over the latching edge of the actuator arm end. A coupling hook is formed on the second edge opposite the latch hook. The coupling hook includes a notch formed centrally therein and extending inward toward the plate surface. The actuator arm end includes a grooved edge with a V-shaped groove formed therein and a latching edge opposite the grooved edge. A tapered pin is inserted between the notch in the coupling hook and the V-shaped groove. The latch hook has a first curved shape and the coupling hook has a second curved shape, so that when the tapered pin is inserted between the coupling hook and the V-shaped groove, the plate surface is pressured against the portion of the actuator arm end proximate thereto.

Two adapter plates can be installed on one actuator arm for a multidisk system in which a single actuator arm is coupled to an upper head for accessing the disk above and a lower head for accessing the disk below. Either of the adapter plates can be removed and reinstalled without affecting the other adapter plate. This arrangement allows two symmetrical, identical adapter plates, one on each side of the actuator arm end. In this arrangement, the actuator arm assembly includes a plurality of actuator arms, each actuator arm including an end section having at least one grooved edge with a V-shaped groove formed therein and a latching edge opposite the grooved edge. The actuator arm assembly for a multidisk system includes a plurality of transducer heads, a plurality of load beams, each of said load beams being coupled to one of said transducer heads, and a plurality of adapter plates, each of said adapter plates being coupled to one of said load beams. Each adapter plate includes a plate surface coupled to one of said load beams, a pair of latch hooks formed on a first edge of the adapter plate with a shape for hooking over the latching edge of the actuator arm and a coupling hook formed on a second edge opposite the latch edge. The coupling hook includes a notch formed centrally therein and extending inward toward the plate surface. A plurality of tapered pins are provided. Each tapered pin is inserted between one of the coupling hooks and a V-shaped groove.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purpose, and therefore resort to the claims is necessary to determine the inventive subject matter.

BRIEF DESCRIPTION OF THE DRAWINGS

FIG. 1 is a perspective view of a disk drive assembly including a plurality of disks and an arm assembly for reading and writing.

FIG. 2 is a perspective view of an end section of an actuator arm and an upper and lower adapter plate with an upper and lower load arm and transducer head respectively attached thereto.

FIG. 3 is a perspective view of the end section assembled with the upper and lower adapter plates and load arms.

FIG. 4 is a vertical cross sectional view of a lower adapter plate coupled to the end section of an actuator arm, and a tapered pin inserted into the slot between the coupling hook of the lower adapter plate and the first V-shaped groove of the end section.

FIG. 5 is a plan view of an assembled coupling taken horizontally from FIG. 3, including a tapered pin inserted between the first V-shaped groove and the notch in the coupling hook.

DETAILED DESCRIPTION OF THE PREFERRED EMBODIMENT

FIGS. 1 through 5 of the drawings disclose various embodiments of the present invention for purposes of illustration only. One skilled in the art will readily recognize from the following discussion that alternative embodiments of the structures and methods illustrated herein may be employed without departing from the principles of the invention.

Reference is first made to FIG. 1 which is a perspective view of a disk assembly 10 and an arm assembly 14 for reading data from disks 12 including a first disk 12a and a second disk 12b. The disk assembly 10 includes conventional motors to rotate the disks 12 about a centrally positioned disk axis 16. The arm assembly 14 rotates about an arm axis 18 to move a plurality of actuator arms 20 including an upper actuator arm 20a, an intermediate actuator arm 20b, and a lower actuator arm 20c, to access different sectors of the disks 12. Although only two disks are illustrated, the present invention has application to a single disk system as well as to any multidisk system with two or more disks.

The upper actuator arm 20a is coupled to a first head 22a through an adapter plate 24a and a load beam 26a. The term "magnetic head assembly" can be used to refer to the adapter plate, load beam, and head. The head 22a is positioned to read and write the top surface of the first disk 12a. The load beam 26a is designed to apply a predetermined load to the head 22a as it moves across the surface of the disk 12a. An intermediate actuator arm 20b is coupled to two heads: an upper head 22b positioned to read and write the bottom surface of the first disk 12a and a lower head 22c positioned to read and write the upper surface of the second disk 12b. The lower actuator arm 20c is coupled to a head 22d positioned to read the bottom surface of the second disk 12b.

Reference is now made to FIG. 2 which is a perspective view of an actuator arm end 30 that is a part of any actuator arm 20. A hole 32 is formed therein for purposes of reducing weight in the actuator arm 20 for faster performance. The actuator arm end 30 includes a first flange 40 that includes a V-shaped groove 42 formed on its outside edge. The actuator arm end 30 also includes a second flange 50 that includes a second V-shaped groove 52 formed on its outer edge. An upper adapter plate 60a is coupled to an upper load beam 62a by any conventional means, such as spot welding. The upper beam 62a is connected to an upper transducer head 64a. The adapter plane 60a is formed of a hard, durable material, preferably stainless steel that is preformed in a die. Conventional wires (not shown) are connected to the transducer head 64a to allow communication between the head and other devices for reading or writing data.

The upper adapter plate 60a includes a pair of latch hooks, including a first latch hook 66a and a second latch hook 67a having an approximate "C" shape for latching onto the actuator arm end 30. Particularly, the first latching hook 66a is affixable to the actuator arm end 30 at section 68a and the second latching hook 67a is affixable to the actuator arm end 30 at section 69a. A slot 70a between the latching hooks 66a,67a has a width sufficient to allow the first flange 40 to fit between the two latching hooks 66a,67a. The upper adapter plate 60a includes a coupling hook 74a formed opposite the latching hooks 66a, 67a. The coupling hook 74a will be described in detail subsequently, particularly with reference to FIGS. 3, 4, and 5.

A lower adapter plate 60b is connected to a load arm 62b and a lower head 64b. The structure of the lower adapter plate 60b is identical to that of the upper plate 60a. Therefore similar numerals are used to reference like structures. For example, the letter "b" designates structures in the lower adapter plate 60b, and the letter "a" designates structures related to the upper adapter plate 60a. Because the upper adapter plate 60a is analogous to the lower adapter plate 60b, the above discussion also applies thereto. The perspective view of the lower adapter plate 60b shows a notch 90b formed within the coupling hook 74b. The notch 90a is also formed in the coupling hook 74a in the upper adapter plate 60.

Reference is now made to FIG. 3 which is a perspective view of the actuator arm end section 30 assembled with the upper adapter plate 60a and the lower adapter plate 60b. The latch hooks 66a,67a are coupled to the arm end 30 at the sections 68a,69a on either side of the flanges 40a and 40b. The coupling hook 74a in the upper adapter 60a is positioned proximate to the second flange 50. A tapered pin 100a fits within the space of the upper coupling hook 74a and the second V-shaped groove 52. Similarly, for the lower adapter plate 80, a tapered pin 100b fits between the space of the lower coupling hook 74b and the first V-shaped groove 42 formed in the first flange 40. Particularly, the notch 90b presses against the tapered pin 100b as will be described subsequently.

Reference is now made to FIG. 4 which is a vertical cross-sectional view of the lower adapter plate 60b coupled to the end section 30. Particularly, the tapered pin 100b is positioned within the coupling hook 74b, and presses against the first V-shaped groove 42. The coupling hook 74b includes the notch 90b which contacts the tapered pin 100b at an interface 110. The tapered pin 100b also contacts the first V-shaped groove 42 at a first surface 112 and a second surface 114. The coupling hook 74b includes a curved shape 120 that is designed so that a flat portion 122 of the lower adapter plate 60 is pressed against the lower surface 124 of the end section 30. At the other end of the lower adapter plate 60b, the latching hook 66b has a curved shape that contacts the end section 30 at a hook interface 130 in the section 68b of the actuator arm end 30.

Reference is now made to FIG. 5 which shows a cross-section of the second tapered pin 100b positioned between a section of the first V-shaped groove 42 and the coupling hook 74b. It can be seen that the notch 90b contacts the second tapered pin 100b at an interface 140. Thus, the second tapered pin 100b is tightly positioned between the notch 90b and the first V-shaped groove 42 in the first flange 40. For some uses, it may be advantageous to use epoxy or some other adhesive to maintain the pin 100b in position. However, for other uses, the pressure exerted on the pin 100b will be sufficient to keep it in position.

When the tapered pin 100b is pressed into the slot formed by the groove 42 and the coupling hook 74b, the pressure on the notch 90b is transferred to the latching hook 66b which presses against the actuator end 30 at the interface 130 and forms a tight connection. Furthermore, the pressure on the notch 90b forces the adapter plate flat surface 122 against the lower surface 124 of the actuator arm end 30 by a combination of forces including an upward pressure on the notch 90b itself and bowing of the curved surface 120. Additionally, the pressure at the interface 130 caused by pressure on the latching hook 66b also tends to force the flat portion 122 of the lower adapter plate 60b against the lower surface 124 of the end section 30 by a combination of upward pressure and bowing of the latch hook 66b.

The above-described features of the adapter plate 60b allow for reliable control of the tightness of the connection between the adapter plate 60b and the actuator arm end 30. Particularly, if the tapered pin 100b installed to a known pressure, then this pressure is translated in a reliable manner to the adapter plate 60b, and particularly to the pressure between the adapter plat flat section 122 and the actuator arm lower surface 124. The tapered pin 100b can be installed easily with conventional techniques to a known and reliable pressure. Thus, by installing the tapered pin 100b to a selected pressure, the pressure of the connection between the adapter plate 60b and the actuator arm end 30 can be reliably established. Furthermore, as can be seen from the figures and the above description, the latching hooks 66b, 67b and the coupling hooks 68b, 69b have a shape that, even in the presence of slight variations in manufacturing and positioning, allow for predictable, reliable pressure at the coupling between the adapter plate 60b and the actuator arm end 30.

From the above description, it will be apparent that the invention disclosed herein provides a novel and advantageous coupler for removably coupling an actuator arm to a transducer head. The foregoing discussion discloses and describes exemplary methods and embodiments of the present invention. As will be understood by those familiar with the art, the invention may be embodied in other specific forms without departing from its spirit or essential characteristics, and thus, the described embodiment is not restrictive of the scope of the invention. For example, if only one adapter plate is to be attached to an actuator, then a second flange on the actuator arm can be omitted. Also, in that instance, instead of two latching hooks, a single latching hook that extends the length of the plate could be used.

The following claims are indicative of the scope of the invention. All variations which come within the meaning and range of equivalency of the claims are to be embraced within their scope.

What is claimed is:

1. In a disk drive unit, a coupler for removably coupling an actuator arm to a load beam that is connected to a head, the actuator arm including an end section having a grooved edge with a V-shaped groove formed therein and a latching edge opposite the grooved edge, said coupler comprising:
   an adapter plate including
      a plate surface for coupling with the load beam, said plate surface including a first edge and a second edge opposite the first edge,
      a latch hook formed on the first edge of the plate surface, said latch hook having a shape for hooking over the latching edge of the actuator arm end, and
      a coupling hook formed on the second edge opposite the latch hook, said coupling hook including a notch formed centrally therein and extending inward toward the plate surface; and
   a tapered pin for inserting between the coupling hook and the V-shaped groove;
   said latch hook having a first curved shape and said coupling hook having a second curved shape, so that when the tapered pin is inserted between the coupling hook and the V-shaped groove, the plate surface is pressured against the portion of the actuator arm end proximate thereto.

2. The coupler of claim 1 wherein the notch in the coupling hook includes an edge for contacting the tapered pin, said edge being formed approximately perpendicular to the direction of insertion of said pin.

3. The coupler of claim 2 wherein said edge is formed in a position to apply pressure between the plate surface and the actuator arm.

4. The coupler of claim 1, further comprising a second latch hook formed on the first edge of the plate surface, said second latch hook having a shape for hooking over the latching edge of the actuator arm end.

5. An actuator arm assembly for a disk drive unit, comprising:
   a transducer head;
   a load beam coupled to the transducer head;
   an actuator arm including an end section having a first flange with a first V-shaped groove formed therein and a first pair of latching edges positioned opposite the first flange;
   an adapter plate including a plate surface coupled to the load beam, a pair of latch hooks formed on a first edge of the adapter plate, said pair of latch hooks having a shape for hooking over the first pair of latching edges on the actuator arm, a coupling hook formed on a second edge opposite the latch hooks, said coupling hook including a notch formed centrally therein and extending inward toward the plate surface; and a tapered pin for inserting between the coupling hook and the V-shaped groove, said tapered pin having a shape so that, when inserted, said tapered pin is wedged between the notch in the coupling hook and the V-shaped groove.

6. The actuator arm assembly of claim 5, further comprising wherein the actuator arm end further comprises:

a second flange positioned between the first pair of latching edges, said second flange having a second V-shaped groove; and a second pair of latching edges formed on opposite sides of said first flange.

7. The actuator arm assembly of claim 6 further comprising:

a second transducer head;

a second load beam coupled to the second transducer head;

a second adapter plate including a second plate surface coupled to the second load beam, a second pair of latch hooks formed on a first edge of the second adapter plate, said second pair of latch hooks having a shape for hooking over the second pair of latching edges on the actuator arm, and a second coupling hook formed on a second edge opposite the second pair of latch hooks, said second coupling hook including a second notch formed centrally therein and extending inward toward the second plate surface; and a second tapered pin for inserting between the second coupling hook and the second V-shaped groove, said second tapered pin having a shape so that, when inserted, said second tapered pin is wedged between the second notch in the second coupling hook and the second V-shaped groove.

8. The actuator arm assembly of claim 5 wherein said latch hook has a first curved shape and said coupling hook has a second curved shape, so that when the tapered pin is inserted between the coupling hook and the V-shaped groove, the plate surface is pressured against the portion of the actuator arm end proximate thereto.

9. The coupler of claim 8 wherein the notch in the coupling hook includes an edge for contacting the tapered pin, said edge being formed approximately perpendicular to the direction of insertion of said pin.

10. The coupler of claim 9 wherein said edge is formed facing the plate surface, in a position to apply pressure between the plate surface and the actuator arm.

11. In a disk drive unit, an actuator arm assembly comprising:

a plurality of actuator arms, each actuator arm including an end section having a grooved edge with a V-shaped groove formed therein and a latching edge opposite the grooved edge;

a plurality of transducer heads;

a plurality of load beams, each of said load beams being coupled to one of said transducer heads;

a plurality of adapter plates for removably coupling said actuator arms with the load beams, each adapter plate including a plate surface coupled to one of said load beams, a pair of latch hooks formed on a first edge of the adapter plate, said latch hooks having a shape for hooking over the latching edge of the actuator arm, a coupling hook formed on a second edge opposite the latch edge, said coupling hook including a notch formed centrally therein and extending inward toward the plate surface; and a plurality of tapered pins, each of said tapered pins for inserting between one of said coupling hook and its respective V-shaped groove, each of said tapered pins having a shape so that, when inserted, said tapered pin is wedged between the notch in the respective coupling hook and the V-shaped groove.

12. The actuator arm assembly of claim 11 wherein each of said pairs of latch hooks has a first curved shape and each of said coupling hook has a second curved shape, so that when one of said tapered pins is inserted between the respective coupling hook and the V-shaped groove, the respective plate surface is pressured against the portion of the actuator arm end proximate thereto.

13. The actuator arm assembly of claim 12 wherein the each of said notches include a notch edge for contacting its respective tapered pin, each of said notch edges being formed approximately perpendicular to the direction of insertion of a respective tapered pin.

14. The actuator arm assembly of claim 13 wherein said notch edge is formed facing its respective plate surface, in a position to apply pressure between the respective plate surface and the actuator arm attached thereto.

* * * * *

UNITED STATES PATENT AND TRADEMARK OFFICE
CERTIFICATE OF CORRECTION

PATENT NO. : 5,296,984
DATED : March 22, 1994
INVENTOR(S) : Fick et al

It is certified that error appears in the above-indentified patent and that said Letters Patent is hereby corrected as shown below:

On the Title Page insert:
--[73] assignee: Maztor Corporation--.

Signed and Sealed this

Twenty-third Day of August, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,296,984
DATED : March 22, 1994
INVENTOR(S) : Adolph L. Fick

It is certified that error appears in the above-indentified patent and that said Letters Patent is hereby corrected as shown below:

On the title page insert:
--[73] Assignee: Maxtor Corporation--

This certificate supersedes Certificate of Correction issued
August 23, 1994

Signed and Sealed this

Twenty-fifth Day of October, 1994

Attest:

BRUCE LEHMAN

*Attesting Officer*  *Commissioner of Patents and Trademarks*